Oct. 26, 1965   J. E. DWYER   3,213,745
ANCHORING SOCKET FOR SCREW TYPE FASTENERS
Filed Sept. 13, 1962
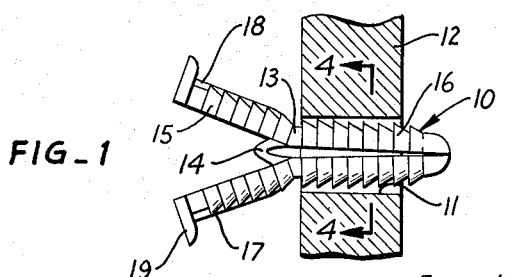
FIG_1
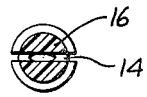
FIG_4
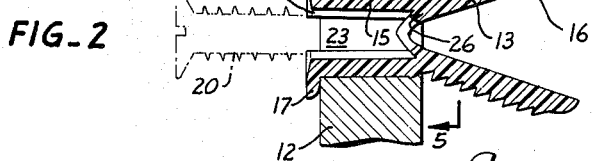
FIG_2
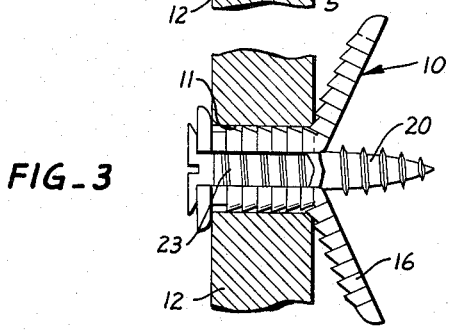
FIG_3
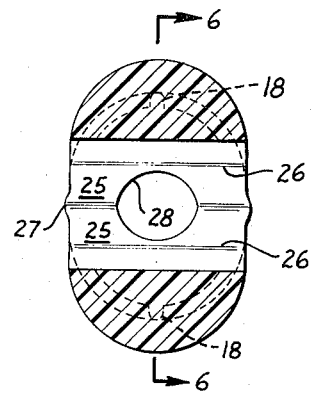
FIG_5
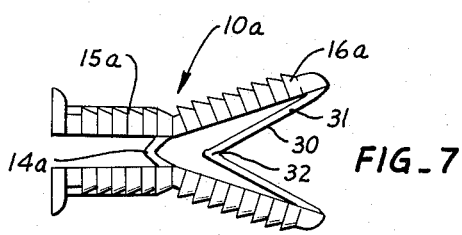
FIG_6
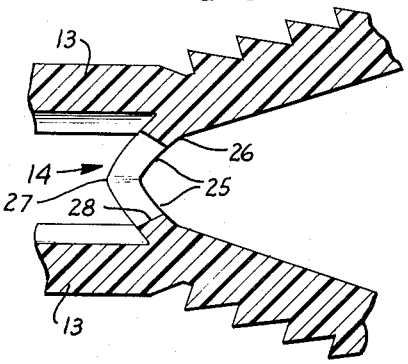
FIG_7
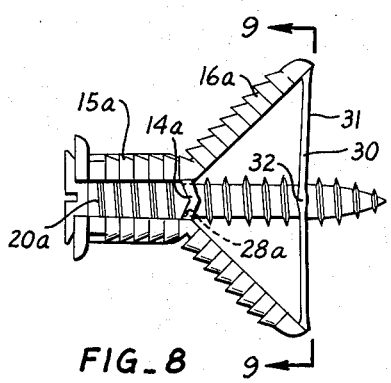
FIG_8
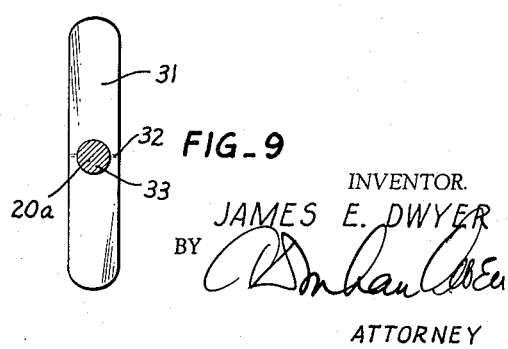
FIG_9
INVENTOR.
JAMES E. DWYER
BY
ATTORNEY

United States Patent Office 3,213,745
Patented Oct. 26, 1965

3,213,745
ANCHORING SOCKET FOR SCREW
TYPE FASTENERS
James E. Dwyer, 2541 Folsom, Apt. 8,
San Francisco, Calif.
Filed Sept. 13, 1962, Ser. No. 223,421
4 Claims. (Cl. 85—80)

This invention relates to an improved socket device for anchoring or securing bolts or screws and the like in walls.

Plaster, gypsum board, thin wood, and other wall materials are usually not strong enough to retain standard screws for supporting fixtures such as drapery traverse rods or lighting fixtures and the like. Thus, in many instances an additional anchoring socket of some form is required in order to secure a bolt or screw to the wall and form a strong and reliable fixture installation. Preferably, the socket should grip the inside of the wall so that it cannot be pulled out and will not twist after the screw or bolt has been inserted and taken up to secure the fixture.

A general object of my invention is to provide an improved anchoring socket, one that can be quickly and easily installed in a wall aperture and which when installed will grip the wall firmly so that the screw or bolt secured by it will support sustained loads without pulling out or twisting.

Another important object of my invention is to provide an anchoring device having a relatively simple but unique one-piece construction and which is thereby particularly well adapted for ease and economy of manufacture.

Still another object of my invention is to provide an anchoring device made of a strong, durable, but resilient plastic material that can be molded as an integral unit.

Another object of the invention is to provide an anchoring socket for screws having a web portion that is retractable inwardly to a compressed compact position but will flex outwardly into an extended position when the screw within the socket is fully taken up to secure the socket tightly within an aperture.

The aforementioned and other important objects of the present invention are accomplished by my improved anchoring socket which is characterized, broadly speaking, by a pair of angular body members that lie adjacent each other and are joined together by an integral connecting web which acts as a hinge or pivot enabling the body portions first to rock together at one end to facilitate the initial insertion of the socket into a wall aperture, and then to be spread apart on the inside of the aperture after insertion therein. The connecting web formed in a manner that enables it to flex or straighten out with a toggle-like action as a screw is advanced within the anchor socket. When the web joint member flexes, the ends of the socket device are caused to spread even farther apart and to press tightly against the rear portion of the wall, thus retaining the socket firmly within the wall aperture.

Other objects, advantages and features of my invention will become apparent from the following detailed description and from the drawings, in which:

FIG. 1 is a view in side elevation of a screw or bolt anchoring socket embodying the principles of the invention with its outwardly bent end portions positioned together and inserted within an aperture in the wall;

FIG. 2 is a view in elevation and in section showing the anchoring socket of FIG. 1 fully inserted into the wall aperture with a screw partially inserted within the socket;

FIG. 3 is a view in elevation showing the anchor socket of FIGS. 1 and 2 with the screw fully inserted and the web flexed into its locking position;

FIG. 4 is a view in section taken along line 4—4 of FIG. 1;

FIG. 5 is an enlarged view in section taken along the line 5—5 of FIG. 2;

FIG. 6 is an enlarged fragmentary view in elevation and in section showing the flexible web member in greater detail;

FIG. 7 is a view in elevation showing a modified form of socket device according to the invention having two locking webs;

FIG. 8 is a view in elevation showing the socket device of FIG. 7 with a screw fully inserted therein and the locking webs flexed into the extended locking position;

FIG. 9 is a view in end elevation and in section taken along the line 9—9 of FIG. 8.

Referring now to the drawings, FIG. 1 shows an anchoring socket 10 embodying the principles of the invention as it appears when initially inserted into an aperture 11 of a wall 12. Generally, it comprises a pair of elongated but angular body portions 13 that are similar in shape and connected together at an intermediate point between their ends by a flexible web member 14. Each of the body portions 13 may be described as having substantially a V-shape and comprising a pair of integral segments 15 and 16 that are relatively inclined to each other at an obtuse angle. The junction of each pair of segments occurs substantially where the flexible web member 14 is connected to the body portions 13. As will become apparent, the segments 15 and 16 both provide different functions. When the socket 10 is fully installed, the front or first segment 15 is adapted to fit snugly within the aperture 11, and the rearward or second segments 16 being bent back against the inside of the wall 12 to secure the socket 10 therein. Before the installation of the socket 10, the body members 13 can be easily rocked back and forth on the connecting web member 14 to bring either the front segment portions 15 or the rearward segments 16 adjacent to each other.

An important feature of my invention and one that should be kept in mind as the description proceeds is that the unique configuration of my socket device enables it to be readily molded as a one-piece unit from some suitable plastic material. Several different plastic materials may be used, but I prefer to use a solid nylon material since it has unusual qualities of strength and resiliency.

Both the front segments 15 and the outwardly inclined rearward body segments 16 are generally semi-circular in cross section and are provided with longitudinally spaced apart circumferential rings or serrations 17 on their outer surface which are preferably sharp edged and sloped outwardly toward the front end of the socket. Each front body segment 15 also has a pair of longitudinally extending external edges 18 extending along its length at opposite sides thereof. At the end of the front body segments 15 is a radially extending bearing flange 19 which serves to seat the anchor socket 10 when it is fully inserted in the aperture 11. The end surface of the flange 19 is preferably countersunk slightly to facilitate the easy insertion of a screw 20. On the inner side of each forward body segment 15 is a longitudinal groove or recess 21, and when the socket 10 is fully within the aperture 11 of the wall as shown in FIG. 2, the adjacent segments 15 are separated somewhat so that the gap between them and the recesses 21 together form an internal longitudinal passage 23 adapted to receive the screw 20. The recesses 21 are preferably somewhat smaller in diameter than the screw 20, so that as the screw is inserted it will bite into the socket and form its own threads within the passage 23 as it is taken up.

The web member 14 connecting the similar body portions 13 of the socket device 10 has generally a V-shape when viewed in elevation before the screw 20 has been inserted. As shown in the enlarged view of FIGS. 5 and 6, it comprises a pair of links or legs 25 that are each connected to a body portion 13 at one end 26 and which when originally formed are joined together at an angle, at a central portion 27 that forms a pivotal axis for the legs 25. In cross section the web 14 has a small central opening 28 that extends across the pivotal axis of the central portion 27 and is aligned with the passage 23 when the forward body segments 15 are together within the wall aperture 11. The central portion 27 of the web member 14 that serves as the pivotal axis for the web 14 may be slightly enlarged to provide increased strength when the legs 25 of the web are caused to flex outwardly and apart as the screw 20 is tightened within the socket.

The steps required for an installation of my socket device 10 are relatively simple and easy to perform, and they are shown progressively in FIGS. 1–3. FIG. 1 shows the outwardly extending body segments 16 rocked together so that the socket 10 can be inserted initially into the aperture 11 in the wall 12. The socket 10 is then inserted the remainder of the way into the aperture 11 by simultaneously pushing axially with the straight body members 15 while also pressing them together. This action causes the socket device 10 to advance easily into the wall aperture 11 until the outer bearing flanges 19 of the forward body segments 15 abut against the outer wall surface. The screw 20 can now be inserted and taken up, preferably threading its way through the passage 23 formed by the straight body portions 15. As the screw 20 is turned and advances through the socket 10 it also engages the web member 14 and commences to pass through the opening 28. The diameter of the screw 20 is somewhat larger than the opening 28 and as the screw engages and passes through the web 14 its axial force pushes the web 14 axially, causing the web legs 25 to spread outwardly from their original retracted position as shown in FIGS. 1 and 2 into their extended position as shown in FIG. 3. When the web member 14 is thus caused to straighten out and it acts like a locking toggle-link and transmits a large force through its legs 25 to the body portions 13. As they spread apart, the web legs 25 push the front segments 15 farther apart causing them to fit more tightly within the aperture 11. They also cause the outwardly extending rearward body segments 16 to spring even farther apart and press back against the rear side of the wall 12. When the web 14 has completely straightened out there is an inherent tendency for it to maintain this extended position and the locking force on the extended body segments 16. This locking position is reached at the time that the screw is fully taken up against whatever bracket or device is being supported by the socket 10.

In a somewhat modified form of the invention shown in FIGS. 6–8, an additional flexible web member 30 is attached to the tips of the mating extended body portions 16a of an anchoring device 10a. This auxiliary web 30 acts in a similar manner to the central web 14a but provides additional force to help bend back the extended body portions 16a when the screw 20a is inserted and taken up. The web 30 is also originally V-shaped and has legs 31 that fold together as the socket 10a is initially inserted and which then flex outwardly as the screw 20a is installed. At its central pivot point 32 the web 30 has an opening 33 that is aligned with the opening 28a in the web 14a.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A one-piece socket device for anchoring a screw within a wall comprising an integral molded plastic member including:

a pair of angular shaped body portions, each said body portion having a first longitudinal segment and a second integral segment inclined thereto and flexible relative to said first longitudinal segments, said first segments each having a radially extending bearing flange at its head end and together having a generally tubular shape, said second segments being spread apart and extending divergently from the other ends of said first segments;

a centrally apertured flexible web member extending between said body portions and integrally interconnecting said body portions at a point intermediate the ends thereof and substantially at the junction of said first and second segments;

said body portions being pivotal about said web member whereupon said second segments are initially adjacent to each other when said device is first inserted within an opening in a wall, said first segments being substantially parallel with each other and said second segments being spread apart when said socket device is fully within the wall opening;

whereby said second segments are caused to spread even further apart to secure said device tightly within the wall opening when a screw means is inserted longitudinally between said first segments and through said web member.

2. A one-piece socket device of resilient plastic material for anchoring a screw to a wall comprising:

a pair of angular shaped body portions, each said body portion having a first longitudinal segment and a second integral segment inclined thereto and flexible relative to said first longitudinal segment, each of said first segments having a generally semi-cylindrical shape with a radially extending bearing flange at its head end and a length substantially equal to the wall thickness;

a normally V-shaped web member with a central opening interconnecting said body portions at a point intermediate the ends thereof and substantially at the junction of said first and second segments;

said body portions being pivotal about said web member so that said first segments can be moved to a substantially parallel position with said second segments spread apart when said socket device is fully within the wall opening;

said web member tending to open up and straighten out from its original V-shape when a screw means is inserted between said first segments and through the opening of said web member, the flexing of said web member thereby causing said second segments to spread further apart and against the rear of the wall to secure said device within the wall opening.

3. A one-piece socket device of resilient plastic material for connecting a screw to a wall comprising:

a pair of angular shaped body portions, each said body portion having a first longitudinal segment and a second integral segment inclined thereto and flexible relative to said first longitudinal segment, each of said first segments having a generally semi-cylindrical shape with a radially extending bearing flange at its head end and a length substantially equal to the wall thickness;

a normally V-shaped web member having a central opening and a pair of integrally connected legs converging inwardly toward the head end of said first segments and forming an angle of less than 180°, said web member interconnecting said body head portions at a point intermediate the ends thereof and substantially at the junction of said first and second segments;

said body portions being pivotal about said web member so that said second segments are initially attached adjacent each other when said device is first inserted within an opening in a wall, said first segments being substantially parallel with each other and said second segments being spread apart when said socket device is fully within the wall opening;

said web member legs being opened up and forced towards an angle of 180° from their original V-shape when engaged by a screw inserted between said first segments and through the opening of said web member, thereby causing said second segments to spread further apart and bear against the rear side of the wall to secure said device tightly within the wall opening.

4. The socket device as described in claim 3 including a series of longitudinally spaced apart serrated portions extending transversely along the exterior of said first longitudinal segments.

References Cited by the Examiner
UNITED STATES PATENTS

| | | | |
|---|---|---|---|
| 1,694,493 | 12/28 | Tomkinson | 85—33 |
| 2,945,085 | 7/60 | Billups. | |
| 2,948,937 | 8/60 | Rapata | 85—40 |
| 2,995,789 | 8/61 | Holton. | |

EDWARD C. ALLEN, *Primary Examiner.*